United States Patent [19]

Mulvihill et al.

[11] 4,050,369

[45] Sept. 27, 1977

[54] CHEESE VAT

[75] Inventors: Thomas Kevin Mulvihill, Limerick; Denis Murphy, Charleville, both of Ireland

[73] Assignee: Golden Vale Food Products Limited, Ireland

[21] Appl. No.: 303,616

[22] Filed: Nov. 3, 1972

[30] Foreign Application Priority Data

Nov. 4, 1971 Ireland .................................. 1395/71

[51] Int. Cl.² .......................... A01J 15/02; B01F 7/00; B29B 1/10
[52] U.S. Cl. ........................................ 99/463; 366/288
[58] Field of Search .................. 99/463, 272; 259/104, 259/122, 8, 108; 165/109; 222/394, 195

[56] References Cited

U.S. PATENT DOCUMENTS

| 2,435,832 | 2/1948 | Harvuot | 222/394 |
| 2,584,887 | 2/1952 | Laurence | 259/108 |

FOREIGN PATENT DOCUMENTS

| 22,621 | 1/1906 | Austria | 165/109 |
| 1,246,652 | 10/1960 | France | 99/463 |
| 1,002,557 | 2/1956 | Germany | 99/463 |
| 1,177,590 | 9/1964 | Germany | 99/272.2 |

Primary Examiner—Harvey C. Hornsby
Assistant Examiner—Robert Pous
Attorney, Agent, or Firm—Diller, Brown, Ramik & Wight

[57] ABSTRACT

The present invention provides a cheese vat comprising a cylindrical vessel and a planetary stirrer. The cheese vat is preferably an enclosed vessel and the base of the vessel forms an endless trough, the lowermost portion of which, in the position of use, being concentric with the center of the base.

7 Claims, 3 Drawing Figures

CHEESE VAT

BACKGROUND OF THE INVENTION

1. Field of the Invention

The invention relates to the manufacture of cheese and in particular to a construction of cheese vat.

2. Description of the Prior Art

Conventional construction of cheese vats for the manufacture of cheese in bulk are of substantially rectangular shape and are open to the atmosphere. This poses two problems, firstly, the vats are difficult to "in-place" clean and secondly, the quality of the cheese produced is often not of a sufficiently high standard due to atmospheric-borne contamination.

SUMMARY

According to this invention there is provided a cheese vat comprising:
- a cylindrical vessel having a base portion, the base portion having a bottom wall with the bottom wall being in the form of a continuous annular upwardly opening trough, the trough having a lowermost portion concentric with and equi-distance from both the center and periphery of the bottom wall, and a stirrer.

The cheese vat is preferably an enclosed vessel and the stirrer is a planetary stirrer.

The main advantages of the present invention are that the shape of the base portion of the cylindrical vessel ensures that all the contents of the vessel will be stirred and also that all the contents of the vessel can be drained out of it. It will be appreciated that enclosing the vessel ensures that the contents are not liable to contamination.

It has also been found with the present invention that, when the effective dimensions of the cylindrical vessel are such that its internal diameter is not more than three times its height, an improved cheese is obtained. It has been found in practice that the rather high diameter/height ratio ensures that the curd in the manufacture of the cheese will not separate and fall to the bottom.

Figure 1:
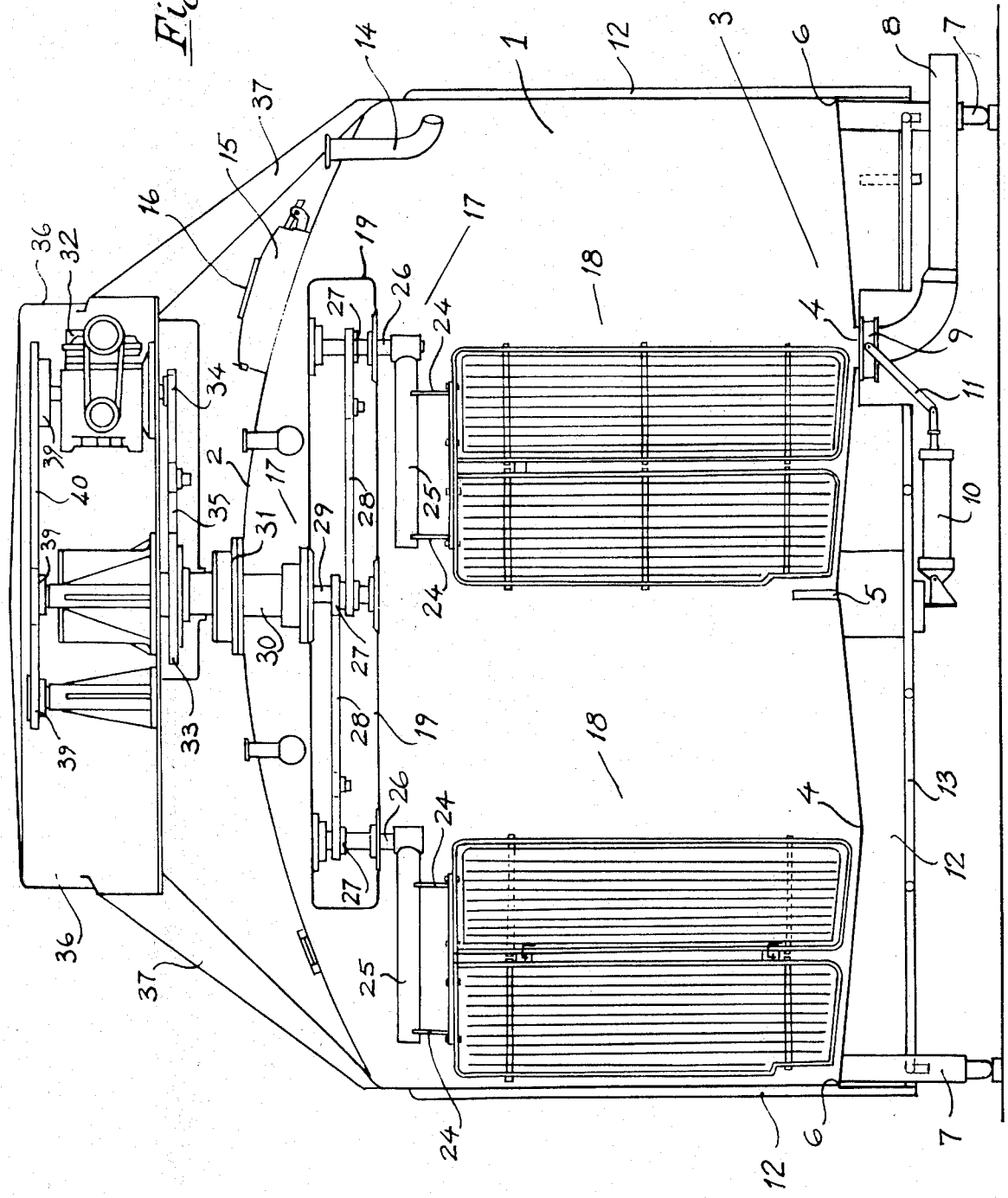
FIG. 1 is a plan partially cut-away, view of a cheese vat according to the invention.
Figure 2:
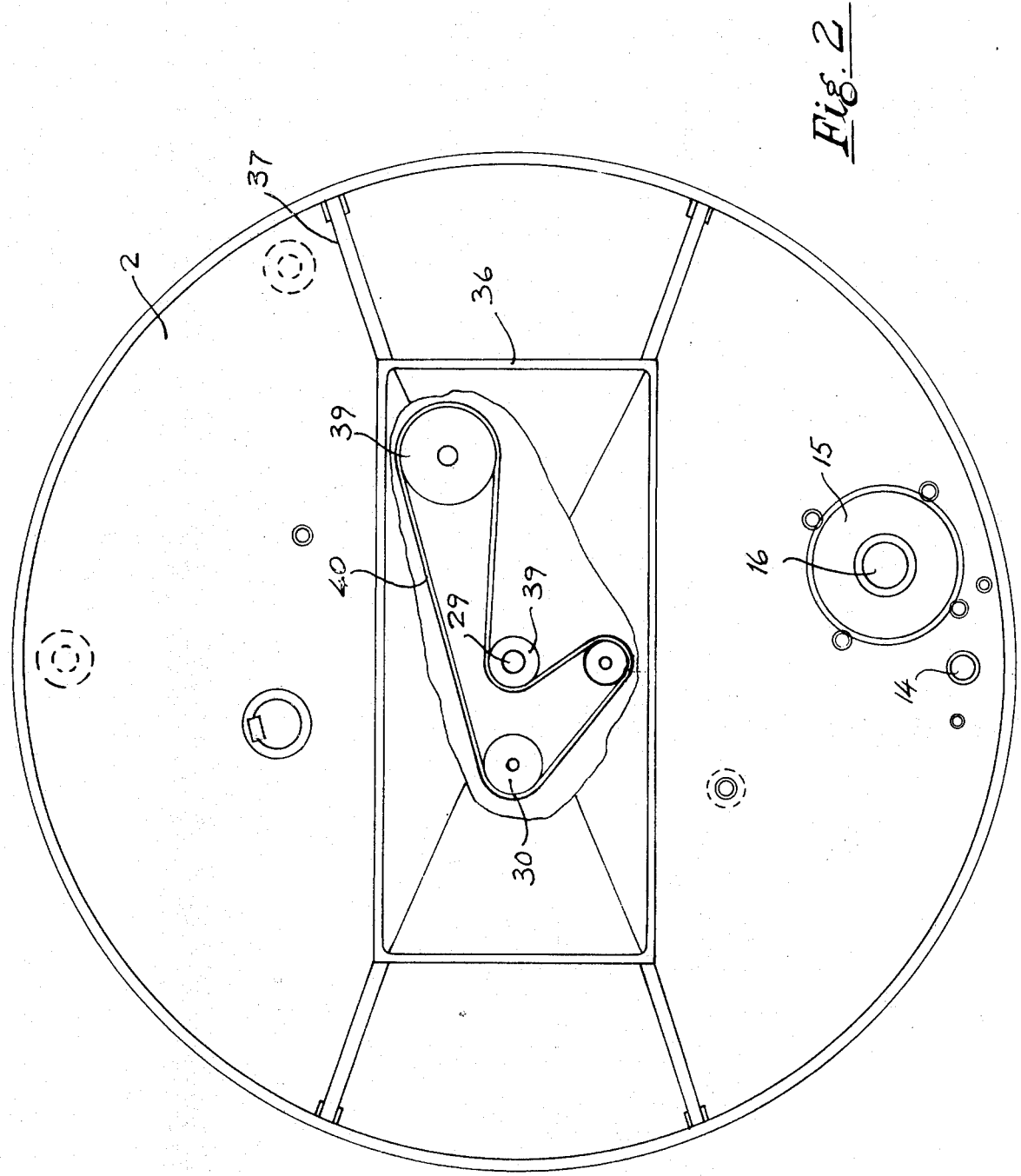
FIG. 2 is a typical cross-sectional elevation of the cheese vat, sectional lines being omitted for clarity.

Referring to the drawings, the cheese vat comprises a cylindrical vessel 1 having a dished cover 2 and a base portion indicated generally by the reference numeral 3. The base portion 3 is in the form of a trough and its lowermost portion 4 is equi-distant from the centre 5 and periphery 6 of the base portion 3. The lowermost portion 4 is concentric with the centre 5. The cylindrical vessel 1 is supported on legs 7. A drainoff pipe 8 is mounted adjacent the lowermost portion 4 of the base portion 3. A butterfly outlet valve 9 is mounted in the drain-off pipe 8 and is operated in conventional manner by a pneumatic ram 10 and linkage 11. The base portion 3 and sides of the vessel 1 are surrounded by a hollow heating and cooling jacket 12 which incorporates steam and/or water distribution piping 13. An inlet pipe 14 and a manhole cover 15, incorporating an inspection window 16, are provided in the dished cover 2.

A stirrer, namely a planetary stirrer, indicated generally by the reference numeral 17, is mounted in the cylindrical vessel 1. The planetary stirrer 17 comprises a pair of paddle blades, indicated generally by the reference numeral 18, and a support framework 19. Each paddle blade 18 comprises a plurality of vertically arranged and laterally spaced cutting blades 20 mounted within a framework 21. The cutting blades 20 have sharp edges 20a (see FIG. 3). A trailing baffle plate 22 is pivotally mounted on the framework 21 at 23. Each framework 21 is suspended by plates 24 from a radial arm 25. Each radial arm 25 is in turn suspended by a shaft 26 from the support framework 19. Each shaft 26 is pivotally mounted within the support framework 19 and is driven by means of pulleys 27 and drive chains 28 from a central shaft 29 which is in turn mounted within a hollow shaft 30. The hollow shaft 30 is rigidly connected to the support framework 19 and is mounted by means of bearings housed within a bearing housing 31 on the dished cover 2. The hollow shaft 30 is driven by a motor 32 through pulleys 33 and 34 and drive chains 35. The motor 32 is housed within a casing 36 mounted by legs 37 on the dished cover 2. The shaft 29 projects through the hollow shaft 30 into the casing 36 and is driven by means of pulleys 39 and drive chains 40 from the motor 32.

Figure 3:
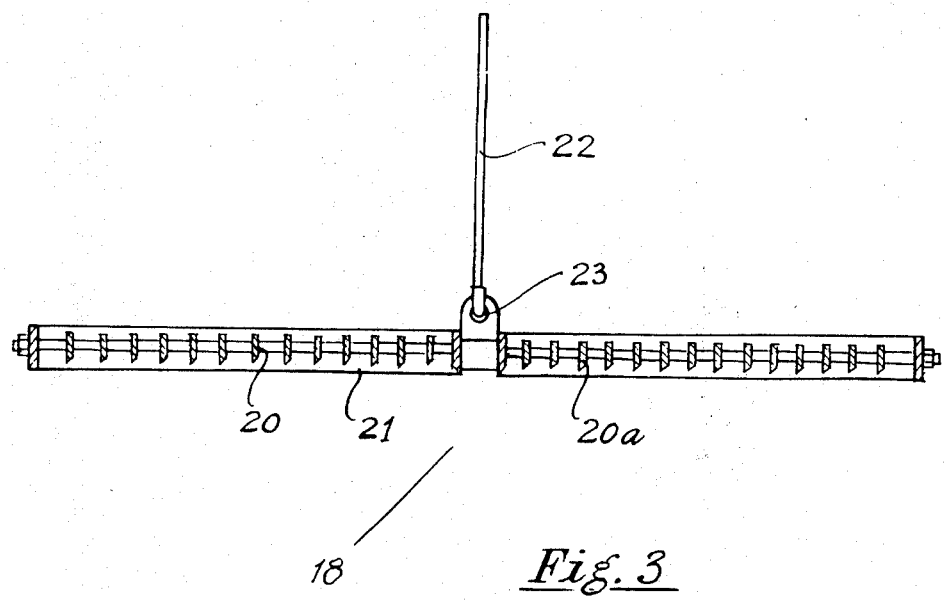
FIG. 3 is a transverse cross-sectional view on an enlarged scale through a paddle blade of the stirrer.

In operation the necessary ingredients for the manufacture of cheese are introduced into the cylindrical vessel 1 through the inlet pipe 14. The motor 32 is operated causing the hollow shaft 30 and the shaft 29 to rotate. Rotation of the shaft of the shaft 30 causes the support framework 19 to rotate around the vessel 1 while rotation of the shaft 29 causes the shaft 26 and hence the radial arms 25 to rotate. The paddle blades 18 are thus rotated relative to the rotatig radial arms 25. Hence each paddle blade 18 has a major axis of rotation co-axial with the vessel 1 and a minor axis of rotation parallel to this major axis of rotation and over the lowermost portion 4 of the trough formed by the base portion 3. When each paddle blade 18 is so rotated that the cutting blades 20 offer their sharp edges 20a to the mixture in the vessel 1 the baffle plate 22 trails behind the paddle blade 18 as illustrated in FIG. 3. If the direction of rotation of the paddle blade 18 is reversed it will be appreciated that the baffle plate 22 will pivot to lie against the framework 21 thus giving increased agitation of the contents of the vessel 1. When the cheese curd has been formed it may be removed through the drain-off pipe 8 by introducing compressed air into the vessel 1 through a compressed air inlet pipe, not shown. The remaining pressing and forming operations are performed on the curd and the vat is in-place cleaned in preparation for the next batch.

It has been found that the effective dimensions of the cheese vat, that is to say, the internal diameter and height of the cylindrical vessel 1 from the top of the paddle blades 18 above the base portion 3 should be so chosen that the internal diameter is not more than three times the height and is preferably approximately twice the height. This ends to produce a curd particularly suitable for subsequent drainage and cheddaring.

It will be appreciated that since the cheese vat according to the invention is a completely enclosed vessel, the manufacture of cheese curd can be performed in a contamination free controlled atmosphere. It will also be appreciated that the curd can be removed without the need for a raised platform, for the vat, to obtain gravity feed or without the necessity of providing a curd pump which can often cause damage to the cheese curd.

What is claimed is:

1. An enclosed vat comprising a vessel, stirrer means in said vessel for stirring contents therein, aid vessel being cylindrical and having a base portion, said base portion having a bottom wall, said bottom wall being in the form of a continuous annular upwardly opening trough, and said trough having a lowermost portion concentric with and equidistant from both the center and periphery of said bottom wall.

2. The enclosed vat as defined in claim 1 wherein said trough when viewed in radial cross section includes a pair of upwardly uniformly sloping diverging walls, one of said pair of walls slopes upwardly to the center of said bottom wall, and the other of said pair of walls slopes upwardly to the periphery of said bottom wall.

3. An enclosed vat comprising a vessel, stirrer means in said vessel for stirring contents therein, said vessel being cylindrical and having a base portion, said base portion having a bottom wall, said bottom wall being in the form of a continuous annular upwardly opening trough, and said trough having a lowermost portion concentric with and equi-distant from both the center and periphery of said bottom wall, said trough when viewed in radial cross section, including a pair of upwardly uniformly sloping diverging walls, one of said pair of walls sloping upwardly to the center of said bottom wall, and the other of said pair of walls sloping upwardly to the periphery of said bottom wall, said stirrer means including a planetary stirrer having a paddle blade having a bottom sloped in accordance with the slope of said bottom wall, said paddle blade having major and minor axes of rotation, the major axis of rotation of said paddle blade being coaxial with the cylindrical vessel, and the minor axis of rotation of said paddle blade being parallel to the major axis of rotation and over the lowermost portion of said trough.

4. The enclosed vat as defined in claim 3 wherein said paddle blade includes a framework, a plurality of vertically disposed and laterally spaced cutting blades mounted in said framework, a trailing baffle plate, and means pivotally mounting said trailing baffle plate behind said cutting blades.

5. The enclosed vat as defined in claim 18 including means for emptying the cylindrical vessel in the form of a drain-off pipe adjacent the lowermost portion of said trough, and a compressed air inlet pipe adjacent a top of said cylindrical vessel.

6. The enclosed vat as defined in claim 3 wherein the internal diameter of said cylindrical vessel is no more than three times its height.

7. The enclosed vat as defined in claim 6 wherein the internal diameter of said cylindrical vessel is twice the height thereof.

* * * * *